Jan. 14, 1947.  G. E. DATH  2,414,222
FRICTION SHOCK ABSORBING MECHANISM
Filed July 16, 1943

Inventor
George E. Dath
By Henry Fuchs.
Atty.

Patented Jan. 14, 1947

2,414,222

UNITED STATES PATENT OFFICE 2,414,222

FRICTION SHOCK ABSORBING MECHANISM

George E. Dath, Chicago, Ill., assignor to W. H. Miner, Inc., Chicago, Ill., a corporation of Delaware Application July 16, 1943, Serial No. 494,925

4 Claims. (Cl. 213—34)

This invention relates to improvements in friction shock absorbing mechanisms.

One object of the invention is to provide a friction shock absorbing mechanism, especially adapted for railway draft riggings, comprising a friction casing having an inwardly tapered friction shell section; a friction clutch including a central wedge; a plurality of wedge blocks surrounding the central wedge and a plurality of friction shoes interposed between the walls of the tapered friction shell section of the casing and the wedge blocks; and a spring resistance opposing inward movement of the clutch, wherein the wedge blocks have wedging engagement with both the central wedge and the friction shoes to provide for differential action, whereby the shock absorbing capacity of the mechanism is materially increased.

Another object of the invention is to provide a friction shock absorbing mechanism comprising a friction casing, a friction clutch within the casing, and spring resistance means within the casing yieldingly opposing inward movement of the clutch, wherein the casing is open at one end only and the parts are insertable through said open end in assembling the mechanism, and are held assembled by shouldered engagement between certain members of the clutch and the friction casing, thereby dispensing with the usual retainer bolt commonly employed to hold the parts of a friction shock absorbing mechanism assembled.

Other objects of the invention will more clearly appear from the description and claims hereinafter following.

Figure 1:
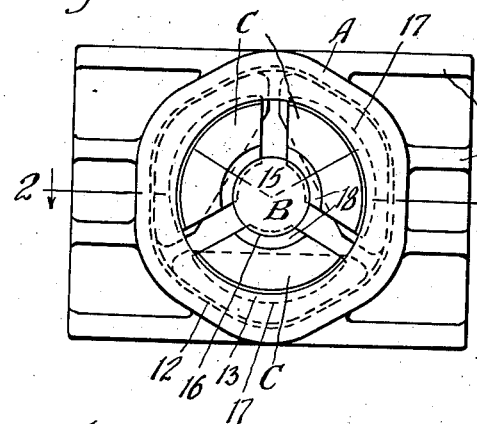
Figure 5:
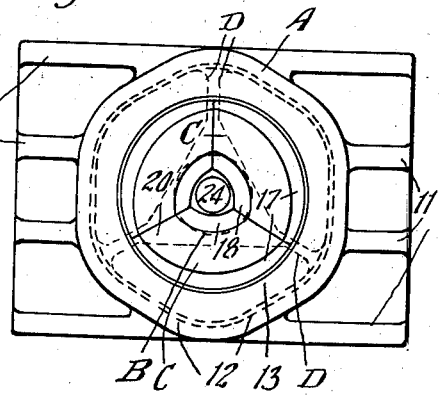
Figure 2:
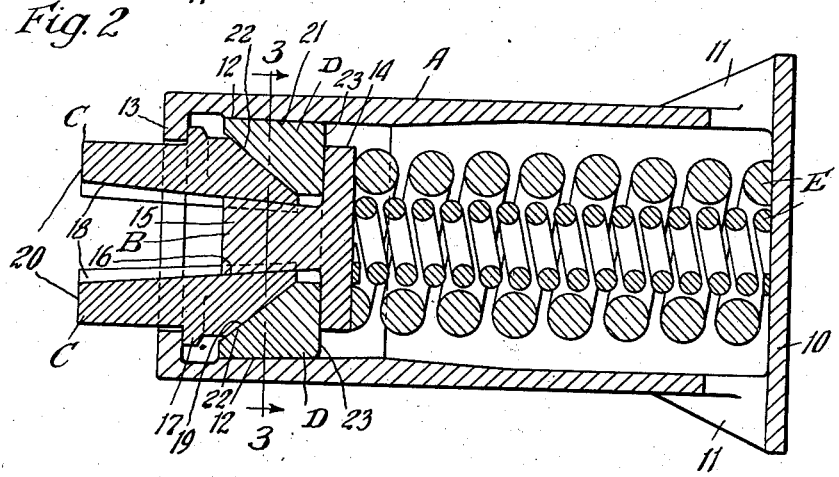
Figure 4:
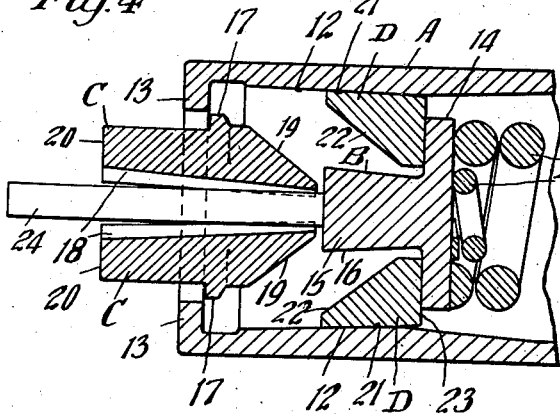
Figure 3:
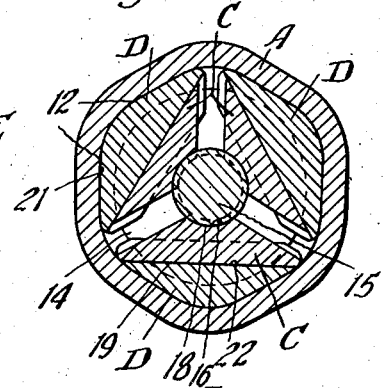

In the drawing forming a part of this specification, Figure 1 is a front elevational view of a friction shock absorbing mechanism embodying my improvements. Figure 2 is a horizontal sectional view, corresponding substantially to the line 2—2 of Figure 1. Figure 3 is a transverse vertical sectional view, corresponding substantially to the line 3—3 of Figure 2. Figure 4 is a view, similar to Figure 2, illustrating the manner of assembling the mechanism, the rear end of the casing being broken away. Figure 5 is a front elevational view of Figure 4, looking from left to right in said last named figure.

As shown in said drawing, my improved friction shock absorbing mechanism comprises broadly a casing A providing a combined friction shell and spring cage; a combined spring follower and central wedge B; three wedge blocks C—C—C; three friction shoes D—D—D; and a spring resistance E.

The casing A is of substantially hexagonal interior and exterior cross section, having the friction shell section at the forward end, which is open, and the spring cage section at the rear end thereof. The casing A is closed at the rear end by a transverse vertical wall 10 which projects at opposite sides beyond the side walls of the casing to provide a rear follower member of rectangular outline, which is integral with the casing. The follower member and casing are reinforced by webs 11—11 formed integral with the follower member and the casing side walls. The friction shell section of the casing is provided with six interior, substantially flat friction surfaces 12—12 which converge inwardly of the casing and are spaced symmetrically about the central longitudinal axis of the mechanism. The interior of the friction shell section thus presents six interior friction surfaces, adjacent surfaces of which are angularly disposed with reference to each other, thereby providing three pairs of surfaces, the adjacent members of each pair together forming a friction face of V-shaped transverse cross section.

At the open end, the casing is provided with a continuous inturned circular retaining flange 13 which overhangs the opening and forms limiting stop means for the wedge blocks C—C—C.

The combined spring follower and central wedge B comprises a relatively heavy circular plate or disc 14 having a forwardly projecting central post thereon forming the central wedge 15 of the mechanism. The wedge 15 is inwardly tapered and is in the form of the frustrum of a cone. The taper of the wedge or post 15 is relatively slight so that the same presents a wedge face 16 of relatively keen angularity with respect to the central longitudinal axis of the mechanism.

The wedge blocks C, which are preferably three in number, are of similar design. The three blocks C—C—C surround the post or wedge 15, as clearly shown in Figures 1 and 2, and project outwardly of the casing. Each block C has an arc-shaped, laterally projecting flange 17 on the outer side thereof, between its ends, which engages in back of the flange 13 of the casing to limit outward movement of the block. On the inner side, each block C is provided with a transversely curved wedge face 18, correspondingly inclined to and fitting the wedge face 16 of the wedge 15. On the outer side, inwardly of the flange 17, each block C is provided with a substantially flat wedge face 19 which is inclined to the longitudinal axis of the mechanism at a greater angle than the wedge face 16 of the wedge 15. At the front ends, the blocks C—C—C are provided with flat abutment faces 20 adapted to be engaged by the usual front follower of the draft rigging of the railway car.

The friction shoes D, which are three in number, are interposed between the blocks C—C—C and the interior friction surfaces 12 of the casing. Each shoe has a friction surface 21 on the outer side thereof of V-shaped transverse cross section, which cooperates with the corresponding V-shaped friction face of the casing formed by two adjacent surfaces 12—12 of said casing. At the inner side, that is, the side nearest the central axis of the mechanism, each shoe has a flat wedge face 22 cooperating with and correspondingly inclined to the wedge face 19 of the corresponding wedge block C. At the rear ends, the shoes have flat transverse end faces 23 bearing on the forward side of the spring follower disc 14 of the member B.

The spring resistance E comprises a relatively light inner coil and a heavier outer coil interposed between the follower disc 14 of the member B and the rear wall 10 of the casing A. The spring resistance is preferably under initial compression in the assembled condition of the parts.

In assembling the mechanism, the spring resistance E, the combined wedge and spring follower B, and the shoes D—D—D are first placed within the casing A by inserting these parts through the open front end of the casing. With the casing A standing on end, the combined wedge and spring follower B is forced inwardly by a cylindrical barlike tool 24 engaging the outer end of the post 15 of said member B. As the member B is forced inwardly, the shoes D—D—D, which are resting on the follower disc 14 will move inwardly therewith. When the parts have been displaced inwardly of the casing, approximately to the position shown in Figure 4, the three wedge blocks C—C—C are entered through the open end of the casing and arranged around the bar 24, as shown, with the flanges 17—17—17 disposed inwardly of the flange 13 of the casing.

The wedge blocks C—C—C are then spread apart to bring the flanges 17 thereof under the flange 13 of the casing, and the tool 24 is withdrawn, permitting the parts to assume the position shown in Figure 2, with the post 15 of the member B engaged between the wedge blocks C—C—C.

The operation of my improved shock absorbing mechanism is as follows: Upon inward movement of the wedge blocks C—C—C with respect to the casing A being produced due to compression of the mechanism, the spring resisted friction shoes D—D—D are wedged apart and carried inwardly of the mechanism against the resistance of the spring E. Due to the taper of the casing, the shoes will be displaced inwardly toward the central axis of the mechanism during said inward movement along the friction surfaces of the casing, thereby causing a differential action between the wedge blocks C—C—C and the shoes D—D—D, whereby the shoes are advanced inwardly more rapidly than the blocks C—C—C and the central wedge B is pulled inwardly with respect to the blocks C—C—C, spreading the latter apart, thus increasing the inward differential movement of the shoes. As will be evident, the compound differential action provided materially increases the shock absorbing capacity of the mechanism.

Upon the actuating force being reduced, the expansive action of the spring resistance E returns the parts to the normal full release position shown in Figure 2, outward movement of the wedge blocks C—C—C being limited by shouldered engagement with the flange 13 of the casing.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing open at one end and having an interior stop shoulder at said open end; of a friction clutch comprising a plurality of wedge blocks, friction shoes surrounding said wedge blocks, and a spreading member between said wedge blocks, said wedge blocks being arranged symmetrically around the central longitudinal axis of the mechanism, said blocks having lateral projections engaging the shoulder of the casing to limit outward movement of said blocks, said friction shoes having sliding engagement with the interior walls of the casing and wedging engagement with said wedge blocks, said spreading member comprising an inwardly tapered stem having wedging engagement with the wedge blocks to hold the same spread apart with the lugs thereof in shouldered engagement with the stop shoulder of the casing, said wedge blocks being insertable through the open front end of the casing when said spreading member is displaced inwardly to clear said blocks; and spring means opposing inward movement of said clutch.

2. In a friction shock absorbing mechanism, the combination with an inwardly tapered friction casing open at one end and closed at the other end, said casing having an inturned stop flange at said open end; of three friction shoes having sliding frictional engagement with the interior of said casing; three wedge blocks having wedging engagement with said shoes, respectively, each of said wedge blocks having a laterally projecting flange engageable in back of the flange of the casing to limit outward movement of said block; an inwardly tapered spreading member engaged between said wedge blocks to hold said wedge blocks spread apart with the flanges thereof in position to engage said flanges of the casing; means on said spreading member engageable with the inner ends of the shoes for limiting outward movement of the spreading member with respect to said shoes; and spring means yieldingly resisting inward movement of the spreading member and shoes.

3. In a friction shock absorbing mechanism, the combination with an inwardly tapered friction casing open at one end and having an inturned stop flange at said open end; of three friction shoes having sliding frictional engagement with the interior of said casing; three wedge blocks having wedging engagement with said shoes, respectively, each of said wedge blocks having a laterally projecting flange engageable in back of the flange of the casing to limit outward movement of said block; a spring follower bearing on the inner ends of said shoes, said spring follower having a central wedge projection rigid therewith engaged between said wedge blocks, said projection and blocks having cooperating wedge faces, said wedge projection holding said blocks spread apart in position to engage said flanges of the casing; and spring means yieldingly resisting inward movement of said spring follower.

4. In a friction shock absorbing mechanism, the combination with a friction casing open at its front end and closed at its rear end, said casing having inwardly converging interior friction surfaces at said open end; of a central rearwardly tapered wedge post of frusto-conical shape having an integral flat spring follower plate at the rear end thereof rigid therewith; three friction shoes having frictional engagement with the friction surfaces of the casing and having flat transverse rear end faces bearing on said spring follower; three friction blocks interposed between the shoes and post, said shoes and blocks having interengaging flat wedge faces, said blocks having transversely curved wedge faces engaging the surface of said post; and a spring resistance within the casing yieldingly opposing inward movement of the spring follower.

GEORGE E. DATH.